United States Patent [19]

Chang

[11] Patent Number: 4,969,274
[45] Date of Patent: Nov. 13, 1990

[54] DISPLACEMENT MEASURING AND REMOTE CONTROL APPARATUS WITH A SHEAVE AND A FLEXIBLE BELT

[76] Inventor: Fu-Rong Chang, No. 29, Lane 596, Min-Sheng S. Rd., Chiayi City, Taiwan

[21] Appl. No.: 255,843

[22] Filed: Oct. 11, 1988

[51] Int. Cl.⁵ .............................................. G01B 5/02
[52] U.S. Cl. ......................................... 33/710; 33/655
[58] Field of Search ................ 33/700, 710, 712, 715, 33/716, 793, 792, 655

[56] References Cited

U.S. PATENT DOCUMENTS

| | | | |
|---|---|---|---|
| 2,276,302 | 3/1942 | Guttmann | 33/710 |
| 3,414,978 | 12/1968 | Prow | 33/800 |
| 3,566,477 | 3/1971 | Williams | 33/710 |
| 3,780,440 | 12/1973 | Taylor | 33/756 |
| 3,791,037 | 2/1974 | DiCiaccio | 33/655 |
| 3,812,589 | 5/1974 | Schultheis | 33/756 |
| 3,922,789 | 12/1975 | Sarrell | 33/655 |

FOREIGN PATENT DOCUMENTS 0033205 3/1977 Japan ....................................... 33/763

Primary Examiner—Harry N. Haroian
Attorney, Agent, or Firm—Willian Brinks Olds Hofer Gilson & Lione

[57] ABSTRACT

A displacement measuring and remote control apparatus includes a sheave having a helical groove therein, a flexible belt wound on the sheave along the helical groove and connected securely to a movable member, an azimuth identification device connected to the sheave for indicating the rotational angle of the sheave. The rotational angle of the sheave can be realized by the azimuth identification device so that it may be converted into the displacement of the movable member. The belt is continually tensed by a tensing device. The apparatus can be used in a hydraulic servo system for the purpose of remotely controlling the movement of a hydraulic driving unit and a driven body.

6 Claims, 6 Drawing Sheets

DISPLACEMENT MEASURING AND REMOTE CONTROL APPARATUS WITH A SHEAVE AND A FLEXIBLE BELT

BACKGROUND OF THE INVENTION

This invention relates to a displacement measuring and remote control apparatus, more particularly to an accurate displacement measuring and remote control apparatus which transfers its motion by a sheave and a flexible belt.

A conventional displacement measuring and remote control apparatus normally transfers its motion by the engagement of two geared or threaded driving elements between which uncurable and irregular worn-out, backlash often occurs. This backlash results in inaccurate measurement and control.

SUMMARY OF THE INVENTION

The main object of this invention is therefore to provide an accurate displacement measuring and remote control apparatus in which geared or threaded driving elements are not used.

The feature of this invention is to provide a displacement measuring and remote control apparatus which includes a sheave, and a flexible belt extending along the helical groove of the sheave and making intimate contact with the sheave.

According to one aspect of this invention, a displacement measuring and remote control apparatus includes a sheave having a helical groove formed in the outer peripheral surface thereof; a flexible belt secured both to the sheave at one end thereof and to a movable member to be measured at the other end of the belt, an intermediate portion of the belt being wound on the sheave along the helical groove; and an azimuth identification device connected to the sheave for indicating the rotational angle of the sheave. The rotational angle of the sheave can be realized by the azimuth identification device so that it may be converted into the displacement of the movable member. The azimuth identification device may be an indicating wheel which is secured coaxially to the sheave for synchronous rotation with the sheave. The indicating wheel has a surface on which angle indicating marks are displayed. A tensing device is connected to the sheave so that the belt is tensed. The sheave includes a tubular body, and a helical hard element secured to the outer peripheral surface of the tubular body for defining the helical groove. To engage the belt intimately with the helical groove of the sheave, said sheave has a shoulder from which a restricting lever extends. The lever is parallel to the axis of the tubular body and spaced apart from the outer peripheral surface of the tubular body at a distance slightly less than double the thickness of the belt so as to prevent overlapping of the belt in the helical groove. In another embodiment, the sheave comprises only one-piece.

According to another aspect of this invention, a servo system includes a driven body; a hydraulic driving unit for hydraulically moving the driven body; a mechanical hydraulic servo valve including a spring-biased spool mounted movably in the servo valve, the spool being biased to move inward, the servo valve being capable of moving the driven body when the spool is moved; a sheave having a helical groove formed in the outer peripheral surface thereof; a flexible belt secured to the sheave at one end thereof and to the spool of the servo valve at the other side of the belt, an intermediate portion of the belt being wound on the sheave along the helical groove so that the belt is tensed; and a rotary driving source connected to the sheave for rotating said sheave. When the sheave is rotated by the rotary driving source, the spool of the servo valve is moved by the sheave through the tensed belt, thereby moving the driven body.

BRIEF DESCRIPTION OF THE DRAWINGS

Other features and advantages of this invention will become apparent in the following detailed description of the preferred embodiments of this invention with reference to the accompanying drawings in which.

DETAILED DESCRIPTION OF THE PREFERRED EMBODIMENTS

Figure 1:
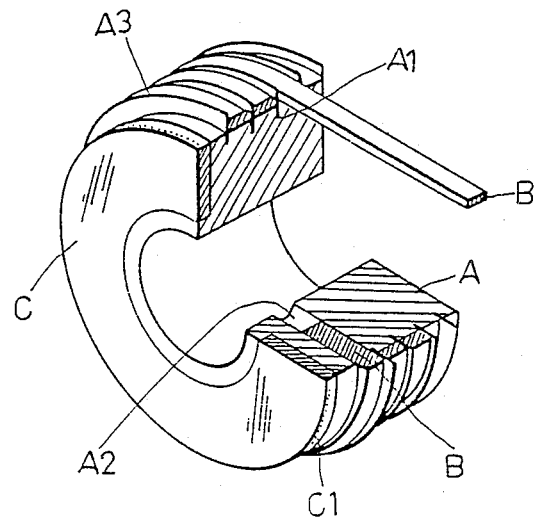
FIG. 1 is a partially sectional perspective view showing a displacement measuring and remote control apparatus according to a first embodiment of this invention.

Referring to FIG. 1, a displacement measuring and remote control apparatus of this invention includes a sheave (A), a flexible metal belt (B) and an indicating wheel (C). The sheave (A) includes a tubular body (A1). The outer peripheral surface of the tubular body (A1) has a helical slit in which a helical hard element (A3) is inserted for defining a helical groove in the sheave (A). In the sheave (A), a small hole (A2) is communicated with the helical groove and contains an end of the belt (B) therein so that the belt (B) is secured to the sheave (A). The other end of the belt (B) is secured to a movable member to be measured. The movable member is not shown in this figure. An intermediate portion of the belt (B) is wound on the outer peripheral surface of the tubular body (A1) along the helical groove. The indicating wheel (C) is secured coaxially to the sheave (A) and has angle indicating marks (C1), such as projections, indentations, colored marks, geometric figures or magnetic marks for indicating the rotational angle of the sheave (A).

Figure 2:
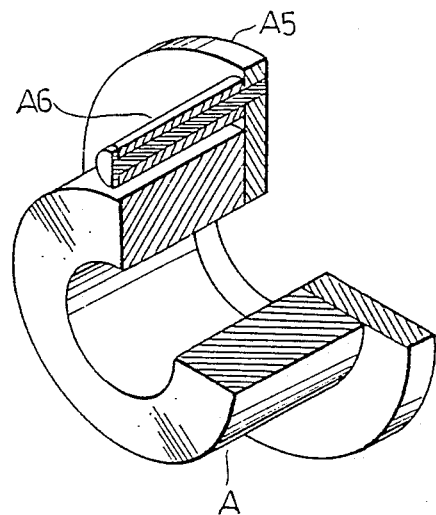
FIG. 2 is a partially sectional perspective view showing a modified form of the displacement measuring and remote control apparatus according to the first embodiment of this invention.

To engage the belt (B) intimately with the tubular body (A1) of the sheave (A), referring to FIG. 2, the tubular body (A1) has a shoulder (A5) from which a restricting lever (A6) extends. The lever (A6) is parallel to the axis of the tubular body (A1) and spaced apart from the outer peripheral surface of said tubular body (A1) at a distance slightly less than double the thickness of the belt (B), so as to prevent overlapping of the belt (B) in the helical groove. Therefore, the belt (B) can extend smoothly along the helical groove of the sheave (A).

Figure 3:
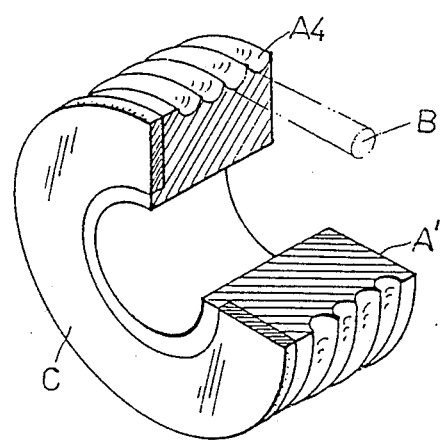
FIG. 3 is a partially sectional perspective view showing a displacement measuring and remote control apparatus according to a second embodiment of this invention.

Referring to FIG. 3, a one-piece sheave (A') may replace both the tubular body (A1) and the helical element (A3).

Figure 4:
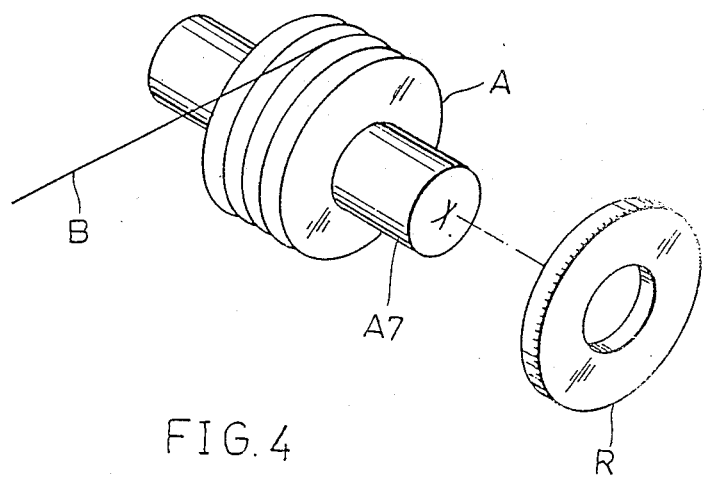
FIG. 4 is a partially exploded perspective view showing a displacement measuring and remote control apparatus according to a third embodiment of this invention.

In addition, referring to FIG. 4, the indicating wheel (C) may be replaced with any other suitable azimuth identification device (R) which is sleeved on the shaft (A7) of the sheave (A). For example, the azimuth identification device (R) may be an encoder, a gyro-optical rule, a counter or an electrical limit switch.

Because the rotational angle of the sheave (A) is proportional to the displacement of the movable member which moves in a direction parallel to the straight portion of the belt (B), the rotational angle of the sheave (A) can be realized by the azimuth identification device (R) so that it may be converted into the displacement of the movable member. That is to say, the displacement of the movable member can be measured remotely.

Figure 5:
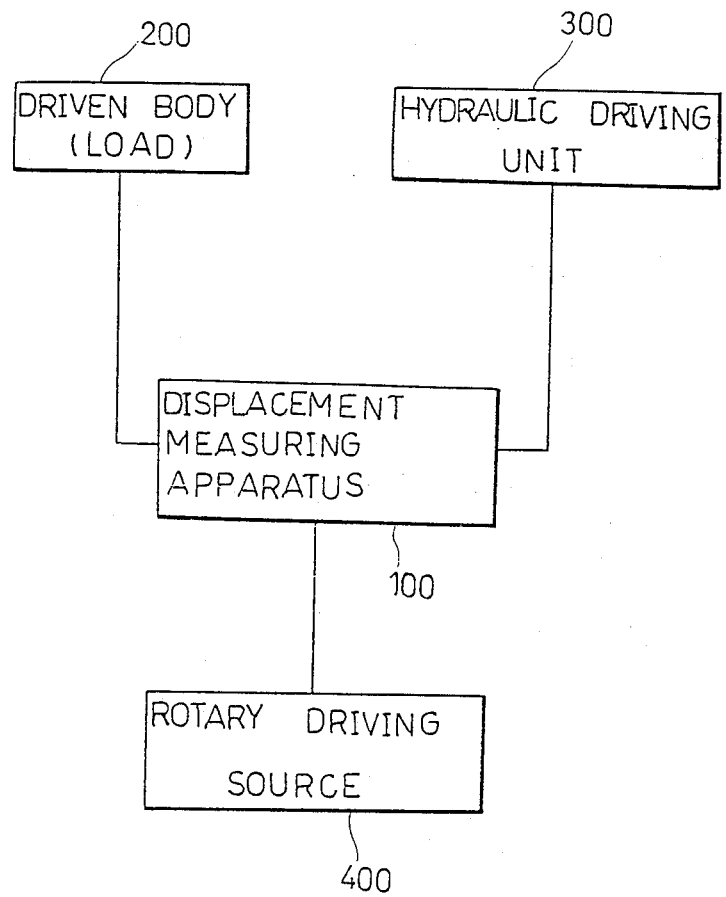
FIG. 5 is a block diagram of a hydraulic servo system using the apparatus of this invention.

FIG. 5 shows a hydraulic servo system equipped with the displacement measuring and remote control apparatus (100) of this invention which is interposed between a driven body (200) and a hydraulic driving unit (300). In this system, the displacement measuring and remote control apparatus (100) is activated by a rotary driving source (400) to drive the hydraulic driving unit (300) so as to move the driven body (200). The rotary driving source (400) may be a stepping motor or a servo motor. The hydraulic driving unit (300) may be a hydraulic cylinder, hydraulic motor or hydraulic rotary actuator turbine. The hydraulic driving unit (300) and the driven body (200) are remotely controlled by the displacement measuring and remote control apparatus (100).

Figure 6:
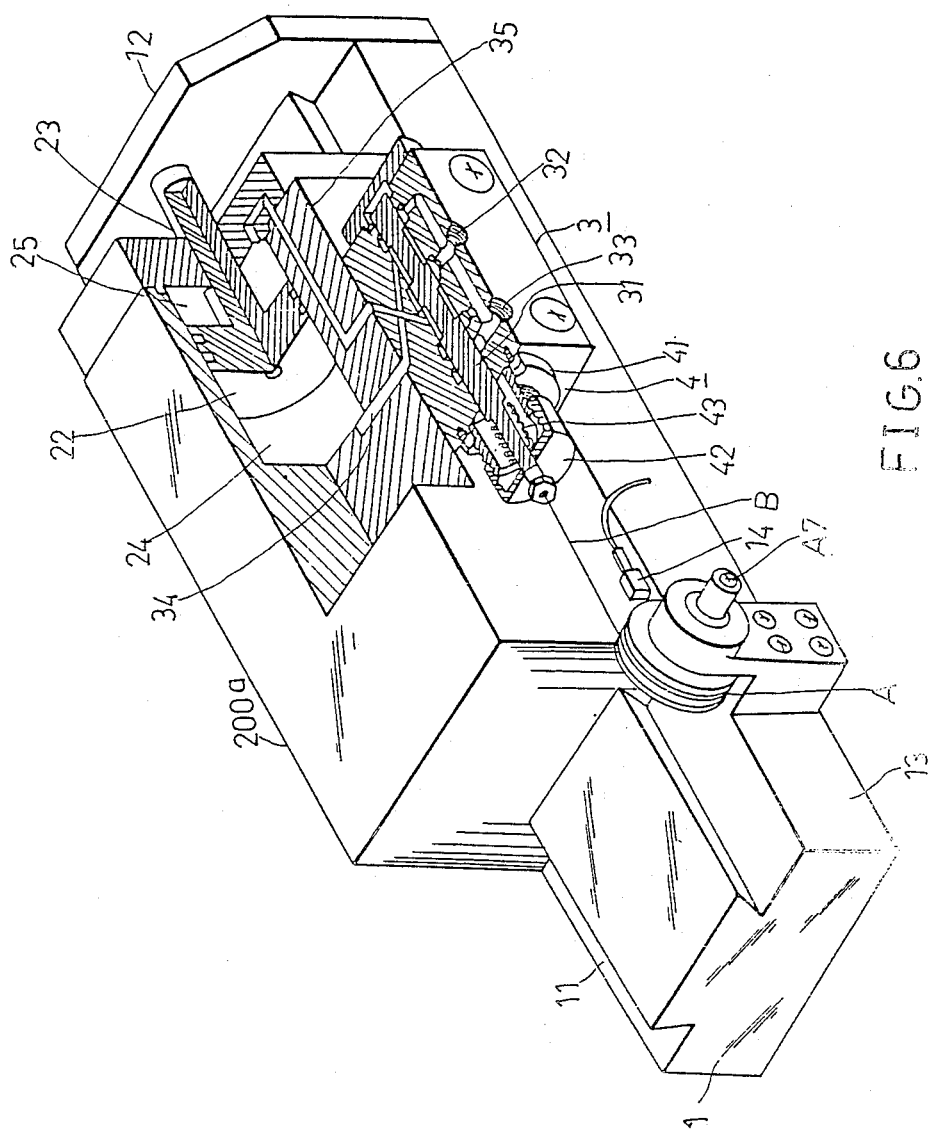
FIGS. 6–10 are schematic views illustrating five embodiments of the hydraulic servo system shown in FIG. 5 which are arranged in accordance with working surroundings.

Referring to FIG. 6, illustrating the remote control portion of the displacement measuring and remote control apparatus (100), the hydraulic driving unit (300) is a hydraulic cylinder (22). The body of the hydraulic cylinder (22) is disposed within a driven body (200a) which can slide along the guideway (11) of a base (1). The piston rod (23) of the hydraulic cylinder (22) is secured to the shoulder (12) of the base (1). The body of the hydraulic cylinder (22) has two chambers (24), (25). A servo valve (3) is attached to the side surface of the driven body (200a) and includes a spool (31) mounted movably therein. Two openings (32), (33) are formed in the servo valve (3) and communicated with the chambers (24), (25) by intersected passages (34), (35). A tension adjusting device (4) includes an externally threaded member (41) secured to one end of the servo valve (3), and an internally threaded cap (42) engaged threadably with the externally threaded member (41). A movable member or spool (31) is passed through the externally threaded member (41) and the internally threaded cap (42) and has a diameter-reduced end portion on which a spring (43) is sleeved. The tensile force of the spring (43) can be adjusted by relative rotation between the externally threaded member (41) and the internally threaded cap (42). The shaft (A7) of the sheave (A) is mounted rotatably on the side surface (13) of the base (1). The end of the belt (B) is fastened to the outer end of the spool (31). The spring (43) biases the spool (31) away from the sheave (A) so that the belt (B) is tensed. The shaft (A7) of the sheave (A) is rotated by a rotary driving source, such as a stepping motor or a servo motor.

In FIG. 6, the spool (31) is in its reference position relative to the servo valve (3). When the sheave (A) is rotated counterclockwise to move the spool (31) to the left, the hydraulic oil enters the chamber (24) of the hydraulic cylinder (22) through the passage (34) so that the driven body (200a) is also moved to the left. The operation of the servo valve (3) is known in this art, so a more detailed description thereof will be omitted. Because the spool (31) is moved synchronously with the driven body (200a), the servo valve (3) continually moves the driven body (200a) to the left until the sheave (A) is stopped and the spool (31) returns to its reference position relative to the servo valve (3). However, when the sheave (A) is rotated clockwise, the spring (43) stretches to move the spool (31) to the right and the servo valve (3) activates the hydraulic cylinder (22) to in turn move the driven body (200a) to the right. Because the moving speed of the belt (B) is slightly lower than that of the servo valve (3), the belt (B) is always tensed so that the driven body (200a) is moved continually to the right. The rotational angle of the sheave (A) can be detected by an optical detector (14).

Figure 7:
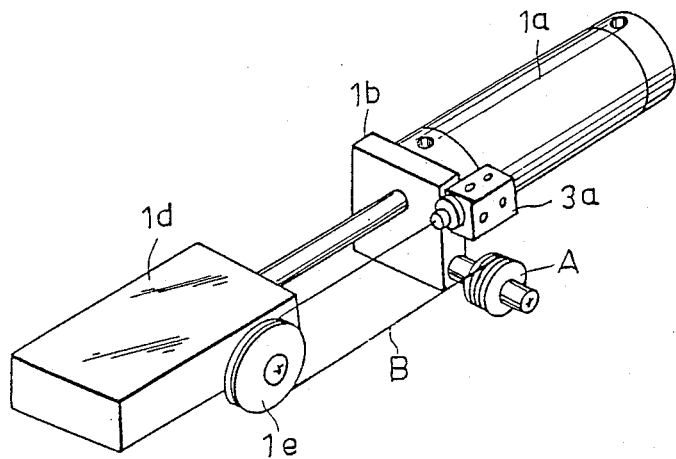

Referring to FIG. 7, a second arrangement of the displacement measuring and remote control apparatus (100) is shown. As illustrated, a mounting block (1b) is secured to a hydraulic cylinder (1a). A servo valve (3a) and the sheave (A) are disposed on the mounting block (1b). A driven body (1d) is secured to the piston rod of the hydraulic cylinder (1a). An idle wheel (1e) is attached to the driven body (1d) so that the belt (B) from the sheave (A) extends around it to connect securely to the spool of the servo valve (3a).

Figure 8:
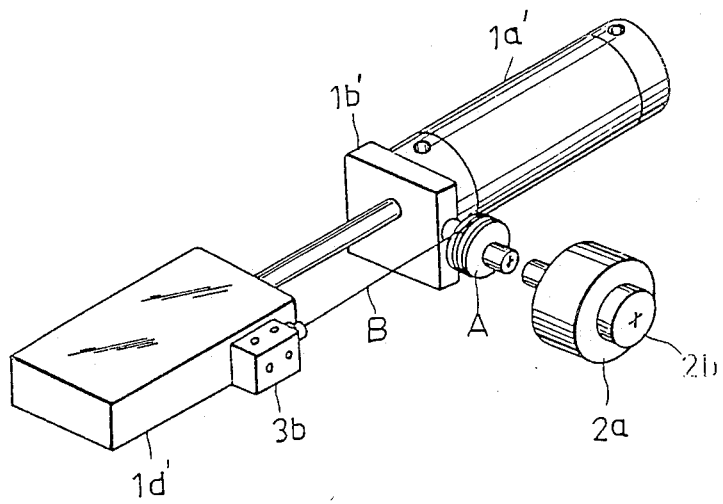

Referring to FIG. 8, a third arrangement of the displacement measuring and remote control apparatus (100) is shown. As illustrated, a servo valve (3b) is attached to a driven body (1d'). The sheave (A) is attached to the mounting block (1b') of the hydraulic cylinder (1a'). A rotary driving source (2a) is provided to drive the sheave (A). An angle analyzer (2b) is attached to the rotary driving source (2a) for the purpose of detecting the rotational angle of the sheave (A).

Figure 9:
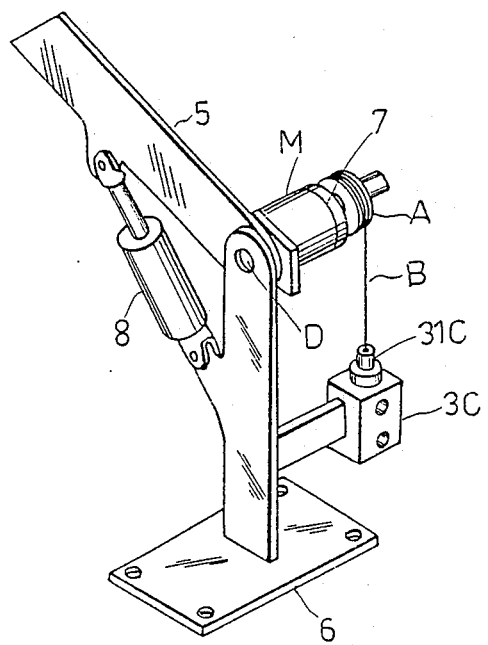

Referring to FIG. 9, a fourth arrangement of the displacement measuring and remote control apparatus (100) is shown. As illustrated, a driven body (5) is mounted rotatably on a support (6) by a pivot member (D). The assembly of a motor (M), a speed reduction unit (7) and the sheave (A), is screwed to the driven body (5). The shaft of the sheave (A) is in line with the pivot member (D). A hydraulic cylinder (8) is fixed on the support (6) and connected to the driven body (5) by the piston rod thereof. A servo valve (3c) is also supported on the support (6) and connected to the belt (B) by the spool (31c) thereof. When the motor (M) is powered and starts to rotate the sheave (A) in one direction, the servo valve (3c) activates the hydraulic cylinder (8) to rotate the driven body (5) in the opposite direction. The driven body (5) will not stop rotating until the spool (31c) returns to its reference position relative to the servo valve (3c).

Figure 10:
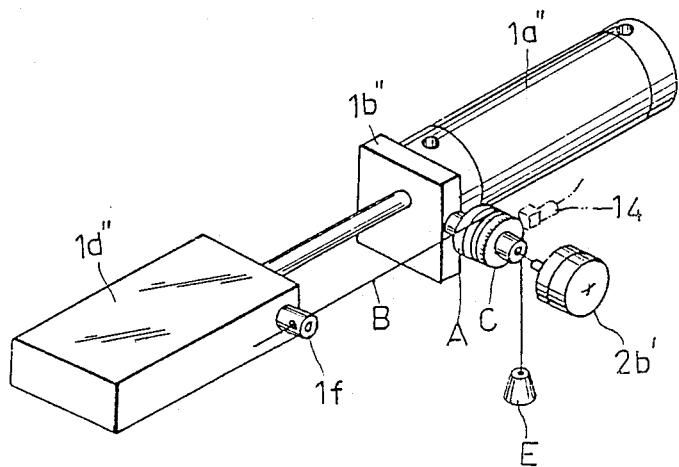

Referring to FIG. 10, a fifth arrangement of the displacement measuring and remote control apparatus (100) is shown. As illustrated, both the sheave (A) and the indicating wheel (C) are attached to the mounting block (1b'') of a hydraulic cylinder (1a''). An angle analyzer (2b') is attached coaxially to the shaft of the sheave (A). The angle analyzer (2b') may be replaced with an optical detector (14) indicated by the dotted lines. A driven body (1d'') is secured to the piston rod of the hydraulic cylinder (1a''). A connecting rod (1f) is secured to the driven body (1d'') and holds the end of the belt (B) thereon. A tensing device (E) is provided on the sheave (A) so as to bias the sheave (A) to rotate clockwise, thereby tensing the belt (B). In other words, when the driven body (1d") is moved toward the hydraulic cylinder (1a"), the belt (B) can still be tensed. In this embodiment, the tensing device (E) includes a cable wound on the shaft of the sheave (A) with counterweight hanging thereon.

Because the belt (B) is always in intimate contact with the outer peripheral surface of the sheave (A), high precision numerical control and accurate displacement measuring can be achieved. Furthermore, the displacement measuring and remote control apparatus of this invention can be arranged in many positions with respect to a particular driven body and a particular servo valve in accordance with the positions of machine tables, gear boxes and heat sources, so as to transfer its motion positively.

With this invention thus explained, it is apparent that numerous modifications and variations can be made without departing from the scope and spirit of this invention. It is therefore intended that this invention be limited only as indicated in the appended claims.

I claim:

1. A servo system comprising:
   a driving body;
   a hydraulic driving unit for hydraulically moving said driven body;
   a mechanical hydraulic servo valve including a spring-biased spool mounted movably in said servo valve, said servo valve being capable of moving said driven body when said spool is moved;
   a sheave having a helical groove formed in an outer peripheral surface thereof;
   said servo valve being attached to said driven body and said sheave being mounted rotatably on said hydraulic driving unit;
   a flexible belt secured to said sheave at one end thereof and to said spool of said servo valve at the other side of said belt, an intermediate portion of said belt being wound on said sheave along said helical groove so that said belt is tensed; and
   a rotary driving source connected to said sheave for rotating said sheave;
   whereby, when said sheave is rotated by said rotary driving source, said spool of said servo valve is moved by said sheave through said tensed belt to activate said hydraulic driving unit, thereby moving said driven body.

2. A servo system as claimed in claim 1, wherein said rotary driving source is a stepping motor.

3. A servo system as claimed in claim 1, wherein said rotary driving source is a servo motor.

4. A servo system as claimed in claim 1, wherein said hydraulic driving unit is a hydraulic cylinder.

5. A servo system as claimed in claim 1, wherein said hydraulic driving unit is a motor.

6. A servo system as claimed in claim 1, wherein an idle wheel is mounted pivotally on said driven body, both said servo valve and said sheave being disposed on said hydraulic driving unit in such a manner that said belt extends around said pulley to interconnect said sheave and said spool.

* * * * *

UNITED STATES PATENT AND TRADEMARK OFFICE
CERTIFICATE OF CORRECTION

PATENT NO. : 4,969,274

DATED : November 13, 1990

INVENTOR(S) : Fu-Long Chang

It is certified that error appears in the above-identified patent and that said Letters Patent is hereby corrected as shown below:

On the title page under the heading "Inventor" please delete "Fu-Rong" and substitute therefor --Fu-Long--.

Signed and Sealed this

Ninth Day of June, 1992

Attest:

DOUGLAS B. COMER

*Attesting Officer*     *Acting Commissioner of Patents and Trademarks*